US008913750B2

(12) United States Patent
Rasizade et al.

(10) Patent No.: US 8,913,750 B2
(45) Date of Patent: Dec. 16, 2014

(54) METHOD FOR MANAGING KEYS AND/OR RIGHTS OBJECTS

(75) Inventors: Oktay Rasizade, Castro Valley, CA (US); Bahman Qawami, San Jose, CA (US); Fabrice Jogand-Coulomb, San Carlos, CA (US); Robert C. Chang, Danville, CA (US); Farshid Sabet-Sharghi, Los Altos Hills, CA (US)

(73) Assignee: SanDisk Technologies Inc., Plano, TX (US)

(\*) Notice: Subject to any disclaimer, the term of this patent is extended or adjusted under 35 U.S.C. 154(b) by 0 days.

(21) Appl. No.: 13/400,427

(22) Filed: Feb. 20, 2012

(65) Prior Publication Data

US 2012/0159644 A1 Jun. 21, 2012

Related U.S. Application Data

(63) Continuation of application No. 11/283,221, filed on Nov. 18, 2005, now Pat. No. 8,156,563.

(51) Int. Cl.
*H04L 9/00* (2006.01)
*G06F 21/10* (2013.01)

(52) U.S. Cl.
CPC ............................... *G06F 21/10* (2013.01)
USPC ............................................. 380/277; 726/27

(58) Field of Classification Search
CPC .................................................... G06F 21/10
USPC ............. 380/258, 277; 713/165, 193; 700/94; 705/51
See application file for complete search history.

(56) References Cited

U.S. PATENT DOCUMENTS

| 5,857,020 | A  | * | 1/1999 | Peterson, Jr. ............... 705/52 |
| 6,367,012 | B1 |   | 4/2002 | Atkinson et al. |
| 6,865,431 | B1 | * | 3/2005 | Hirota et al. ............... 700/94 |
| 7,036,020 | B2 |   | 4/2006 | Thibadeau |
| 7,215,771 | B1 |   | 5/2007 | Hamlin |

(Continued)

FOREIGN PATENT DOCUMENTS

| EP | 1 055 994 | 11/2000 |
| EP | 1 056 092 | 11/2000 |

OTHER PUBLICATIONS

Buhse, Wills, "Implications of Digital Rights Management for Online Music—A Business Perspective," T. Sander (Ed.), Security and Privacy in Digital Rights Management, ACM CCS-8 Workshop DRM 2001, pp. 201-212.

(Continued)

*Primary Examiner* — Samson Lemma
(74) *Attorney, Agent, or Firm* — Brinks Gilson & Lione

(57) ABSTRACT

One or more rights objects (RO) files may be used for storing RO's preferably in the protected area available only to authenticated users. A RO navigation file is stored preferably in an unprotected public area containing status bits, where each status bit identifies whether a location in a RO file contains a valid RO or not. Preferably, there is a one-to-one correspondence between the location for a RO in a RO file and a location in the RO navigation file for the status bit which identifies whether its corresponding location in the RO file contains a valid RO or not. Whether a particular location in a RO file contains a valid RO or not can be found by checking its corresponding status bit in the RO navigation file.

34 Claims, 8 Drawing Sheets

(56) References Cited

U.S. PATENT DOCUMENTS

| | | | |
|---|---|---|---|
| 7,426,747 | B2 | 9/2008 | Thibadeau |
| 7,493,656 | B2 | 2/2009 | Goodwill et al. |
| 2002/0108049 | A1* | 8/2002 | Xu et al. .................. 713/193 |
| 2003/0053631 | A1* | 3/2003 | Un ............................ 380/277 |
| 2004/0117309 | A1 | 6/2004 | Inoue et al. |
| 2005/0149726 | A1* | 7/2005 | Joshi et al. .............. 713/164 |
| 2006/0021068 | A1* | 1/2006 | Xu et al. .................. 726/30 |
| 2006/0075258 | A1* | 4/2006 | Adamson et al. ........ 713/189 |
| 2006/0107047 | A1 | 5/2006 | Bar-El |
| 2006/0232826 | A1 | 10/2006 | Bar-El |
| 2006/0262928 | A1 | 11/2006 | Bar-El et al. |

OTHER PUBLICATIONS

Office Action for U.S. Appl. No. 11/283,225, dated Apr. 2, 2009, 15 pages.

Office Action for U.S. Appl. No. 12/774,174, dated Sep. 29, 2011, 31 pages.

Pinkas, "Efficient State Updates for Key Management", Tomas Sander (Ed.): DRM 2001, LNCS 2320, pp. 40-56, 2002.

Search Report and Written Opinion for Corresponding PCT Application No. PCT/US2006/060928, dated Oct. 18, 2007, 11 pages.

Search Report for Corresponding TW Application No. 095142629, dated Feb. 2, 2010, 1 page.

Office Action for U.S. Appl. No. 12/774,174, dated May 11, 2012, 36 pages.

Notice of Allowance for U.S. Appl. No. 12/774,174, dated Sep. 26, 2012, 5 pages.

* cited by examiner

US 8,913,750 B2

METHOD FOR MANAGING KEYS AND/OR RIGHTS OBJECTS

CROSS-REFERENCE TO RELATED APPLICATIONS

This application is a continuation of U.S. patent application Ser. No. 11/283,221 filed on Nov. 18, 2005, now U.S. Pat. No. 8,156,563, which is hereby incorporated by reference. Also, this application is related to U.S. patent application Ser. No. 11/283,225 and Ser. No. 12/774,174.

BACKGROUND OF THE INVENTION

This invention relates in general to encryption/decryption systems, and in particular a system for managing keys used for encryption and/or decryption and/or rights objects that control use of or access to content.

Media content such as music, video and games is distributed increasingly as digital files. Such digital content has been distributed widely through a number of channels, including the internet and the use of storage devices. The digital content may be stored in a number of different types of devices, such as magnetic or optical disks, tapes, and non-volatile memories such as flash memories. The digital content in these storage devices can be played, stored and operated by a wide variety of devices such as personal computers of both the desk top and portable types, iPods and other types of embedded or stand alone media players, personal digital assistants ("PDA"), game controllers, MP3 players, and cellular phone handsets (referred to collectively herein as "host devices").

In order for the owners of the digital content to reduce or prevent unauthorized access to the content, the digital content is frequently encrypted so that only authorized users may access the content. With the proliferation of a large number of different digital files, such as songs, the number of keys that needs to be managed can be quite large. Furthermore, for enhanced security, multiple keys may be involved in the encryption and decryption of each of the digital files. Therefore, a problem that can be anticipated in digital rights management ("DRM") is the capability to efficiently manage a large number of keys and to determine the right key for encrypting and/or decrypting any particular digital file.

A number of key management systems have been used. In a first type of key management system, the content file is named so as to make it easier to identify and locate the encryption and/or decryption key. In another type of key management system known as the encrypting file system ("EFS"), the key used for encrypting the file is itself encrypted and the encrypted key is stored in the header of the corresponding encrypted content file. While the above key management systems may be useful for some applications, they each have their limitations. None of the above systems are entirely satisfactory. It is therefore desirable to provide a key management system that is more flexible and easier to use.

In digital rights management (DRM), each content file may be associated with rules regarding or controlling how the content file can be accessed and/or used. Such rules are referred to as rights objects in DRM. For example, the rules may specify that the content file may only be accessed for a limited number of times, before certain expiration dates or only for certain time durations. Hence, when it is desired to control use of and/or access to a content file, a rights object is created, which may contain the above described rules as well as content encryption/decryption keys that are used for encrypting/decrypting a content file. The rights object is then also associated with the content file controlled by the rights object. Frequently, the rights objects control use of and/or access to the content files by controlling access to content encryption/decryption keys that are used to encrypt/decrypt the content files. Thus, in order to be able to use and/or access a protected content file, one would first retrieve or otherwise obtain the rights object associated with it, decipher the rules in the rights object, and then use or access the content file in accordance with the rules. Where the content file is encrypted, the key(s) are retrieved from the associated rights object and used to decrypt the file before the content therein can be used or accessed. When it is desired to control use of and/or access to a content file, a rights object is created with rules governing use and/or access to the file and with any encryption/decryption keys that are used to encrypt/decrypt the content file, which object is associated with such content file.

In DRM, there may be a large number of rights objects that need to be managed. Thus, it may also be desirable to provide a management system for managing rights objects that is more flexible and easier to use and can manage a large number of rights objects.

SUMMARY OF THE INVENTION

According to one embodiment of the invention, a key navigation file and one or more key storage files may be used to facilitate key management. The content files that are to be encrypted and/or decrypted each comprises a header portion containing location information which indicates which key storage file contains the key that is to be used for encrypting and/or decrypting the content file. The key navigation file contains status information that indicates whether a valid key is stored at one or more locations in the one or more key storage files. This facilitates a process of locating a location in the one or more key storage files for storing a key. Preferably the status information indicates one or more locations in the one or more key storage files at which one or more valid key(s) are not stored.

A key navigation mechanism comprising the above described key navigation file and one or more key storage files may be stored in a non-volatile computer readable medium.

In one implementation of the above embodiment, the key navigation file is stored in the public unprotected area of a storage medium and the one or more key storage files for storing the keys are stored in a protected area of the medium which can be accessed only by authenticated users, applications or devices. For obvious reasons, it is desirable to store the one or more key storage files in the protected area not accessible to unauthorized access. Thus, by providing the key navigation file in the public area which contains status information indicating whether one or more locations in the key storage file(s) contains a valid key or not, this greatly enhances key management performance. Thus, one does not need to access the protected area in order to find out whether a particular key in the key storage file is valid or not; instead, this information is readily available in the key navigation file which can be accessed without authentication. This feature also makes it particularly easy to delete a content file and its encryption/decryption key. The deletion of the key can simply be accomplished in one implementation by changing the status information in the key navigation file, without actually having to access the key storage file in the protected area containing the key in order to delete the key.

According to one more embodiment of the invention, the key navigation file and the one or more key storage files can be readily used in a process for encrypting/decrypting a content file. Each of the entries in the key navigation file corresponds to a location in the one or more key storage files for storing one of a plurality of encryption/decryption keys. The key navigation file may be opened to permit the finding of an entry therein which does not correspond to a valid key at a location in the one or more key storage files. An encryption/decryption key is generated and the content file is encrypted/decrypted thereby. The encryption/decryption key is then stored at the location in the one key storage file corresponding to the entry in the key navigation file that has been found.

In one implementation of the above embodiment, key navigation information may be derived from the location of the entry in the key navigation file found to not correspond to a valid key and this location information is inserted in the header portion of the encrypted file. Thus, in a reverse process, by deciphering the location information in the header portion of the encrypted file, the location of the encryption/ decryption key in one of the key storage file or files can be found and retrieved for decryption and/or encryption of the encrypted file.

According to another embodiment of the invention, the content file may be decrypted using a decryption key in a key storage file in a protected area of a storage medium. The header portion of the content file contains key navigation information that indicates location of the encryption/decryption key in the key storage file for/decrypting the content file. The key navigation information is retrieved from the header portion of the content file and the location in the key storage file at which the decryption key is stored is then derived from the key navigation information. The decryption key is then obtained from the protected area and used for decrypting the content file. This process can also be used to find a particular key in a key storage file for encrypting a content file, where the location information of such key can be found in the header of the content file.

In one particular implementation of the embodiment immediately above, a plurality of key storage files are used for storing keys. In this implementation, the key navigation information in the header portion of the content file comprises an index, which can be an integer. Each of the key storage files contains m locations for storing keys. The index is divided by m to obtain a quotient. The integer portion of the quotient indicates which one of the plurality of key storage files stores the decryption/encryption key and the remainder portion, also called an offset herein, indicates the location in such key storage file at which the decryption/encryption key is stored.

Yet another embodiment of the invention is directed to a method for invalidating an encryption/decryption key stored in a key storage file and used for encrypting/decrypting a content file by means of a key navigation file containing status information that indicates whether the key stored in the key storage file is valid or not. The content file comprises a header portion containing location information which indicates the location of the key in the key storage file. Location information of the key in the key file is obtained from the header portion of the content file. The status information of the key in the key navigation file is located using the location information.

The status information of the key in the key navigation file is altered to indicate that the key is invalid.

Any one of the methods described above may be performed by a computer program executed by a processor, where the program is stored in a computer readable storage medium.

According to another embodiment of the invention, a computer program stored in a computer readable medium may be used to facilitate key management. The computer program creates a key navigation file and one or more key storage files when one or more of such files do not already exist. Each content file comprises a header portion containing location information indicating which key storage file contains the encryption/decryption key for such content file. The key navigation file contains status information that indicates whether one or more locations in the one or more key storage files contain a valid key or not.

In one implementation of the above embodiment, an entry is found in the key navigation file which does not correspond to a valid key in the at least one key storage file. Key navigation information for the content file is obtained from location of said entry in the key navigation file. An encryption/decryption key is generated and used to encrypt/decrypt the content file. The encryption/decryption key is stored at a location in the at least one key storage file corresponding to the entry.

According to another embodiment of the invention, a computer program stored a computer readable medium encrypts/ decrypts a content file using an encryption/decryption key in a key storage file in a protected area of the storage device. The content file header contains key navigation information that indicates the location of the encryption/decryption key in the key storage file. The computer program retrieves the key navigation information from the content file, derives from the key navigation information the location in the key storage file at which the encryption/decryption key is stored, obtains the encryption/decryption key and encrypts/decrypts the content file using such key. In one implementation of this embodiment, a plurality of key storage files each containing m locations are used for storing keys. The key navigation information comprises an index, which can be an integer, and the computer program finds which one of the key storage files stores the decryption/encryption key and the location in such key storage file at which the key is stored by dividing the index by m to obtain a quotient. The integer portion of the quotient indicates which one of the plurality of key storage files stores the decryption/encryption key and the remainder portion, also called an offset herein, indicates the location in such key storage file at which the decryption/encryption key is stored.

The methods practiced by the above described computer programs are the subjects of other aspects of the invention.

According to still another embodiment of the invention, a non-volatile computer readable medium stores a key navigation mechanism, where the medium comprises at least one protected area and at least one unprotected area. The mechanism comprises a key navigation file and at least one key storage file. Each key storage file contains a plurality of keys at corresponding locations in such key storage file, said keys used for encryption and/or decryption of a corresponding one of a plurality of content files. The mechanism includes a first directory tree in the at least one unprotected area of the medium, said first directory tree comprising a directory that contains a list of the plurality of content files and the key navigation file. The mechanism includes also a second directory tree in the at least one protected area of the medium, said second directory tree comprising a directory that contains a list of the keys in the at least one key storage file, said two directory trees having structures that mirror each other.

The above described systems and methods may also be adapted for managing content protection information, such as the rules governing access to and/or use of content, instead of or in addition to managing keys. Thus in one example application, the above described systems and methods may be adapted for managing rights objects that control use of and/or access to content files.

Thus, according to yet another embodiment of the invention, a rights object navigation file and one or more rights object storage files may be used to facilitate rights object management. The content files that are to be controlled by means of the rights objects each comprises a header portion containing location information which indicates which rights object storage file contains the rights object that is to be used for controlling use of and/or access to the content file. The rights object navigation file contains status information that indicates whether a valid rights object is stored at one or more locations in the one or more rights object storage files. This facilitates a process of locating a location in the one or more rights object storage files for storing a rights object key. Preferably the status information indicates one or more locations in the one or more rights object storage files at which one or more valid key(s) are not stored.

A rights object navigation mechanism comprising the above described rights object navigation file and one or more rights object storage files may be stored in a non-volatile computer readable medium.

In one implementation of the above embodiment, the rights object navigation file is stored in the public unprotected area of a storage medium and the one or more rights object storage files for storing the rights objects are stored in a protected area of the medium which can be accessed only by authenticated users, applications or devices. For obvious reasons, it is desirable to store the one or more rights object storage files in the protected area not accessible to unauthorized access. Thus, by providing the rights object navigation file in the public area which contains status information indicating whether one or more locations in the rights object storage file(s) contains a valid rights object or not, this greatly enhances rights object management performance. Thus, one does not need to access the protected area in order to find out whether a particular rights object in the rights object storage file is valid or not; instead, this information is readily available in the rights object navigation file which can be accessed without authentication. This feature also makes it particularly easy to delete a content file and its associated rights object. The deletion of the rights object can simply be accomplished in one implementation by changing the status information in the rights object navigation file, without actually having to access the rights object storage file in the protected area containing the rights object in order to delete the rights object.

According to one more embodiment of the invention, the rights object navigation file and the one or more rights object storage files can be readily used in a process for associating a rights object with a content file. Each of the entries in the rights object navigation file corresponds to a location in the one or more rights object storage files for storing one of a plurality of rights objects. The rights object navigation file may be opened to permit the finding of an entry therein which does not correspond to a valid rights object at a location in the one or more rights object storage files. A rights object is generated and the content file is associated with it. The rights object is then stored at the location in the one rights object storage file corresponding to the entry in the rights object navigation file that has been found.

In one implementation of the above embodiment, rights object navigation information may be derived from the location of the entry in the rights object navigation file found to not correspond to a valid rights object and this location information is inserted in the header portion of the encrypted file. Thus, in a reverse process, by deciphering the location information in the header portion of the content file, the location of the rights object in one of the rights object storage file or files can be found and the rights object retrieved for using and/or accessing the content file.

According to another embodiment of the invention, the content file may be encrypted/decrypted using a encryption/decryption rights object in a rights object storage file in a protected area of a storage medium. The header portion of the content file contains rights object navigation information that indicates location of the rights object in the rights object storage file associated with the content file. The rights object navigation information is retrieved from the header portion of the content file and the location in the rights object storage file at which the rights object is stored is then derived from the rights object navigation information. The rights object is then obtained from the protected area and used for accessing and/ or otherwise for using the content file. This process can also be used to find a particular rights object in a rights object storage file when use of and/or access to a content file is desired, where the location information of such rights object can be found in the header of the content file.

In one particular implementation of the embodiment immediately above, a plurality of rights object storage files are used for storing rights objects. In this implementation, the rights object navigation information in the header portion of the content file comprises an index, which can be an integer. Each of the rights object storage files contains m locations for storing rights objects. The index is divided by m to obtain a quotient. The integer portion of the quotient indicates which one of the plurality of rights object storage files stores the rights object and the remainder portion, also called an offset herein, indicates the location in such rights object storage file at which the rights object is stored.

Yet another embodiment of the invention is directed to a method for invalidating a rights object stored in a rights object storage file and used for controlling use of and/or access to a content file by means of a rights object navigation file containing status information that indicates whether the rights object stored in the rights object storage file is valid or not. The content file comprises a header portion containing location information which indicates the location of the rights object in the rights object storage file. Location information of the rights object in the rights object file is obtained from the header portion of the content file. The status information of the rights object in the rights object navigation file is located using the location information. The status information of the rights object in the rights object navigation file is altered to indicate that the rights object is invalid.

Any one of the methods described above may be performed by a computer program executed by a processor, where the program is stored in a computer readable storage medium.

According to another embodiment of the invention, a computer program stored in a computer readable medium may be used to facilitate rights object management. The computer program creates a rights object navigation file and one or more rights object storage files when one or more of such files do not already exist. Each content file comprises a header portion containing location information indicating which rights object storage file contains the rights object for such content file. The rights object navigation file contains status information that indicates whether one or more locations in the one or more rights object storage files contain a valid rights object or not.

In one implementation of the above embodiment, an entry is found in the rights object navigation file which does not correspond to a valid rights object in the at least one rights object storage file. Rights object navigation information for the content file is obtained from location of said entry in the rights object navigation file. A rights object is generated and is associated with the content file. The rights object is stored at a location in the at least one rights object storage file corresponding to the entry.

According to another embodiment of the invention, a computer program stored in a computer readable medium controls use of and/or access to a content file by means of a rights object in a rights object storage file in a protected area of the storage device. The content file header contains rights object navigation information that indicates the location of the rights object in the rights object storage file. The computer program retrieves the rights object navigation information from the content file, derives from the rights object navigation information the location in the rights object storage file at which the rights object is stored, obtains the rights object and uses or accesses the content file by means of such rights object. In one implementation of this embodiment, a plurality of rights object storage files each containing m locations are used for storing rights objects. The rights object navigation information comprises an index, which can be an integer, and the computer program finds which one of the rights object storage files stores the rights object and the location in such rights object storage file at which the rights object is stored by dividing the index by m to obtain a quotient. The integer portion of the quotient indicates which one of the plurality of rights object storage files stores the rights object and the remainder portion, also called an offset herein, indicates the location in such rights object storage file at which the rights object is stored.

According to still another embodiment of the invention, a non-volatile computer readable medium stores a rights object navigation mechanism, where the medium comprises at least one protected area and at least one unprotected area. The mechanism comprises a rights object navigation file and at least one rights object storage file. Each rights object storage file contains a plurality of rights objects at corresponding locations in such rights object storage file, said rights objects used for controlling use of and/or access to a corresponding one of a plurality of content files. The mechanism includes a first directory tree in the at least one unprotected area of the medium, said first directory tree comprising a directory that contains a list of the plurality of content files and the rights object navigation file. The mechanism includes also a second directory tree in the at least one protected area of the medium, said second directory tree comprising a directory that contains a list of the rights objects in the at least one rights object storage file, said two directory trees having structures that mirror each other.

The methods practiced by the above described computer programs are the subjects of other aspects of the invention.

The above features may be used alone or together in any combination.

BRIEF DESCRIPTION OF THE DRAWINGS

For simplicity in description, identical components are identified by the same numerals in this application.

DESCRIPTION OF EXEMPLARY EMBODIMENTS

Figure 1:
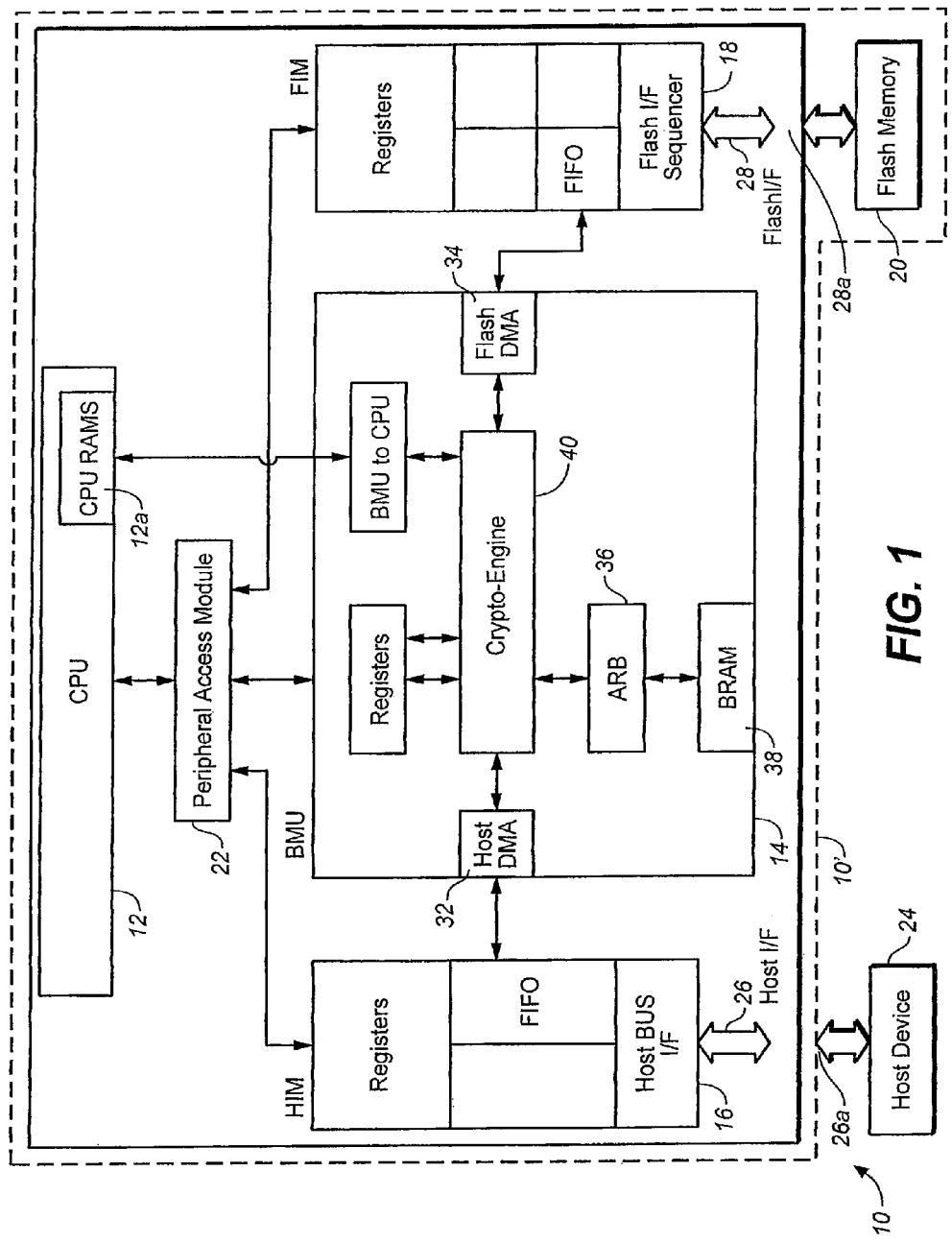
FIG. 1 is a block diagram of a memory system in communication with a host device to illustrate the invention.

An example memory system in which the various embodiments of the present invention may be implemented is illustrated by the block diagram of FIG. 1. As shown in FIG. 1, the memory system 10 includes a central processing unit (CPU) 12, a buffer management unit (BMU) 14, a host interface module (HIM) 16 and a flash interface module (FIM) 18, a flash memory 20 and a peripheral access module (PAM) 22. Memory system 10 communicates with a host device 24 through a host interface bus 26 and port 26a. The flash memory 20 which may be of the NAND type, provides data storage for the host device 24. The software code for CPU 12 may also be stored in flash memory 20. FIM 18 connects to the flash memory 20 through a flash interface bus 28 and port 28a. HIM 16 is suitable for connection to a host system like a digital camera, desk top or portable personal computer, personal digital assistant (PDA), digital media player, MP-3 player, video game players and cellular telephone or other digital devices. The peripheral access module 22 selects the appropriate controller module such as FIM, HIM and BMU for communication with the CPU 12. In one embodiment, all of the components of system 10 within the dotted line box may be enclosed in a single unit such as in memory card or stick 10' and preferably encapsulated in the card or stick within the same housing or container.

The buffer management unit 14 includes a host direct memory access (HDMA) 32, a flash direct memory access (FDMA) controller 34, an arbiter 36, a buffer random access memory (BRAM) 38 and a crypto-engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to the BRAM 38. The HDMA 32 and FDMA 34 are responsible for data transported between the HIM 16, FIM 18 and BRAM 38 or the CPU random access memory (CPU RAM) 12a. The operation of the HDMA 32 and of the FDMA 34 is conventional and need not be described in detail herein. The BRAM 38 is used to buffer data passed between the host device 24, flash memory 20 and the CPU RAM 12a. The HDMA 32 and FDMA 34 are responsible for transferring the data between HIM 16/FIM 18 and BRAM 38 or the CPU RAM 12a and for indicating sector transfer completion.

First when data from flash memory 20 is read by the host device 24, encrypted data in memory 20 is fetched through bus 28, FIM 18, FDMA 34, crypto engine 40 where the encrypted data is decrypted and stored in BRAM 38. The decrypted data is then sent from BRAM 38, through HDMA 32, HIM 16, bus 26 to the host device 24. The data fetched from BRAM 38 may again be encrypted by means of crypto engine 40 before it is passed to HDMA 32 so that the data sent to the host device 24 is again encrypted but by means of a different key and/or algorithm compared to the those whereby the data stored in memory 20 is decrypted. Preferably, and in an alternative embodiment, rather than storing decrypted data in BRAM 38 in the above-described process, which data may become vulnerable to unauthorized access, the data from memory 20 may be decrypted and encrypted again by crypto engine 40 before it is sent to BRAM 38. The encrypted data in BRAM 38 is then sent to host device 24 as before. This illustrates the data stream during a reading process.

When data is written by host device 24 to memory 20, the direction of the data stream is reversed. For example if unencrypted data is sent by host device, through bus 26, HIM 16, HDMA 32 to the crypto engine 40, such data may be encrypted by engine 40 before it is stored in BRAM 38. Alternatively, unencrypted data may be stored in BRAM 38. The data is then encrypted before it is sent to FDMA 34 on its way to memory 20. Where the data written undergoes multi-stage cryptographic processing, preferably engine 40 completes such processing before the processed data is stored in BRAM 38.

While the memory system 10 in FIG. 1 contains a flash memory, the system may alternatively contain another type of non-volatile memory instead, such as magnetic disks, optical CDs, as well as all other types of rewrite-able non volatile memory systems, and the various advantages described above will equally apply to such alternative embodiment. In the alternative embodiment, the memory is also preferably encapsulated within the same physical body (such as a memory card or stick) along with the remaining components of the memory system.

Title Key Management

Figure 2:
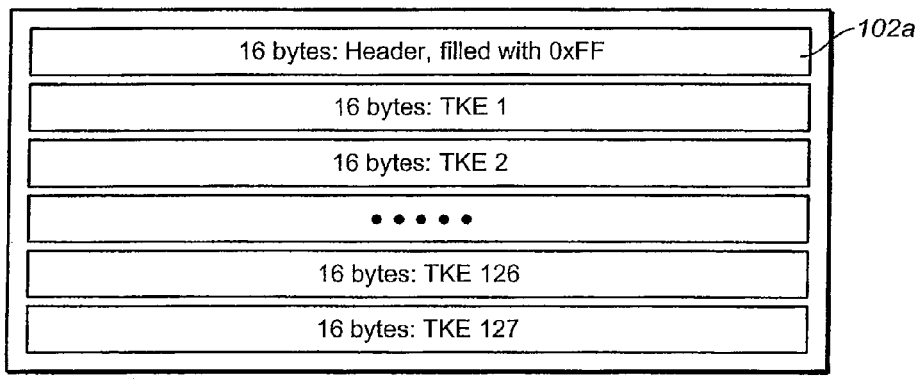
FIG. 2 is a diagram illustrating the structure of a title key file.

FIG. 2 is a schematic diagram showing the structure of a title key file to illustrate one embodiment of the invention. Where a large number of encryption/decryption keys are employed for digital rights management, it may be convenient to organize and store the keys in a plurality of individual title key files, such as the one shown in FIG. 2. In the embodiment of FIG. 2, the title key file 102 is designed with 127 slots or locations for containing up to 127 keys. As shown in FIG. 2, file 102 contains a total of 128 slots or locations, where the very first slot or location 102*a* is reserved for a header and is not used for storing keys. Initially, the 127 slots or locations may contain all 1's or 0's, or arbitrary values, which are not valid key values. Preferably, valid title key entries ("TKE") are written consecutively to the 127 slots or locations by overwriting the initial values, so that when all 127 slots or locations are filled with valid key values, they contain the following values: TKE1, TKE2, . . . TKE127. Preferably, whether a particular title key entry is a valid key or not is indicated by a title key status bit stored in a key navigation file illustrated in FIG. 3A. Thus by checking the corresponding title key status bit of any particular title key entry in file 102, it is possible to determine whether such entry consists of or contains a valid key or not, without having to actually access the title key file 102.

Figure 3A:
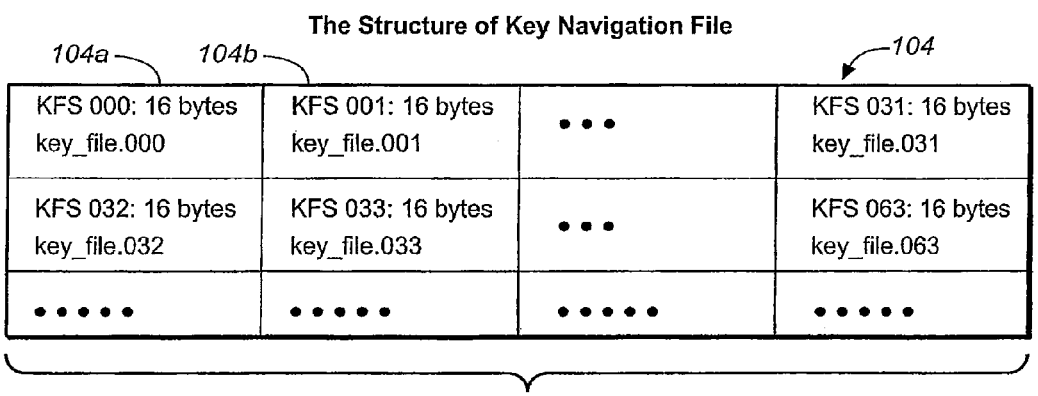
FIG. 3A is a diagram illustrating the structure of a key navigation file.

FIG. 3A is a schematic view of a key navigation file to illustrate its structure. As shown in FIG. 3A, the key navigation file 104 includes a large number of key file status ("KFS") fields: KFS000, KFS001, . . . KFS031, KFS032, KFS033 . . . KFS063 . . . . Each of the title key status fields contains the title key status bits of the corresponding title key file. Thus the key file status field 104*a* titled KFS000 contains the 127 title key status bits of the 127 title key entries in title key file 102, so that file 104*a* needs 16 bytes of storage. When the number of keys used for encryption/decryption exceeds 127, all of the slots or locations in title key file 102 will have been used up, so that a new title key file needs to be created for storing keys in excess of 127. The title key status field 104*b* is then created within the key navigation file 104 for storing the title key status bits to indicate the status of the excess title key entries in such new title key file. FIG. 3A illustrates a situation where at least 64 title key files have been created, so that the key navigation file 104 includes at least 64 title key status fields, from KFS000 to KFS063. The relationship between the key navigation file 104 and the title key files is illustrated in more detail in FIG. 3B.

Figure 3B:
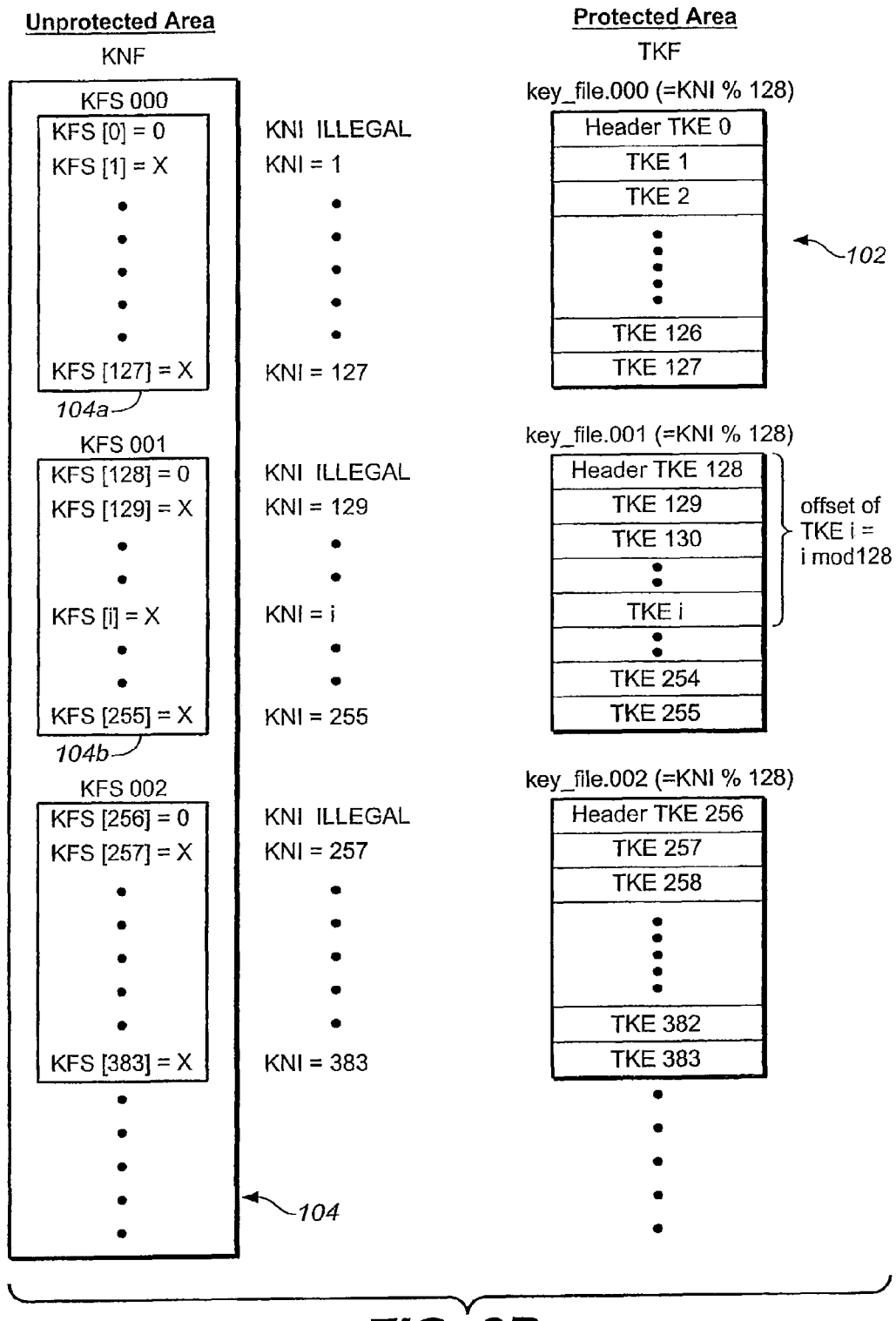
FIG. 3B is a diagram showing the key navigation file in FIG. 3A and a number of title key files of the type shown in FIG. 2, to illustrate the relationship between them.

As shown in FIGS. 3A and 3B, the title key files are given the name in the format "key_file.xxx," where xxx is the serial number of the title key file. Thus the first created key file 102 is given the file name key_file.000 and the next created key file is assigned the name key_file.001 and so on.

In one embodiment, each slot or location and the entry therein in the key navigation file 104 has a known one-to-one correspondence relationship with a particular slot or location in one of the title key files, and the title key entry at such slot or location. In this manner, in order to check whether a particular title key entry contains a valid key or not, it would be necessary only to find the location or slot in the key navigation file 104 that corresponds to such title key entry in a title key file and check the key file status bits at that location in the key navigation file 104.

In this embodiment of the invention, the title key entries are labeled sequentially across the different title key files as shown in FIG. 3B. Thus, the title key entries in title key file key_file.000 are labeled TKE1-TKE127. The title key entries in title key file key_file.001 are labeled TKE129-TKE255. And those in title key file key_file.002 are labeled TKE257-TKE383, and so on. The first location and entry of each of the title key file (i.e. TKE0, TKE128, TKE256 . . . ) are reserved for the header, which may contain information such as size of the file, version number and other information about the file. Thus each title key entry has a unique number associated therewith, which is one of the following: 1-127, 129-255, 257-383 and so on. This unique number is then preferably also used to identify the particular location in the key navigation file where the corresponding key file status bit is located. As shown in FIG. 3B, the key file status bits corresponding to the title key entries are stored at locations in the same sequence as the title key entries across the different title key files. For example, as illustrated in FIG. 3B, the key file status bit "KFS[i]" for indicating whether the title key entry TKE[i] contains a valid key or not is stored at the ith location in the key navigation file 104, counting from the first location at the top of the first key file status field KFS000, even where the ith location is in a key file status field that is different from KFS000. In other words, this unique number is unique across all key status fields, and it is numbered consecutively starting from the first entry at the top of KFS000 across all key file status fields KFS 000, KFS 001 . . . , until the last key file status entry in key navigation file 104.

In this manner, by checking the particular location of a key file status bit and the unique number associated with such bit in the sequence of such unique numbers in the key navigation file 104, one can readily determine which particular title key file, and the location in such file can one then find the corresponding title key entry, using a simple process described below. The opposite process is therefore also true. If one knows the unique number associated with a particular title key file and the location in such file of a particular title key entry, the corresponding key file status bit for such entry can also be located in the key navigation file 104.

In this one embodiment, the process for finding the title key entry corresponding to a particular key file status bit in the key navigation file 104 can be implemented as follows. The unique number associated with each title key entry and its corresponding key file status bit is referred to as the key navigation index ("KNI"). Thus the KNI values 0, 128, 256, 384, . . . (N+128) are illegal, where N is an integer. KNI is therefore also the offset of the key file status bit in the key navigation file 104 from the very first status bit in the header of KFS000. By noting the location, offset and thus its corresponding value of KNI of the particular status bit in the key navigation file 104, one can readily determine the location of the corresponding title key entry. This is done by dividing the value KNI by the number of slots in each of the title key files and key file status fields, that is, by 128 in the embodiment of FIG. 3B. The integer portion of the quotient then provides the serial number of the title key file that contains the corresponding title key entry. In other words, the serial number of the title key file containing such title key entry is given by integer portion of KNI/128. The particular location of such title key entry in the title key file containing such entry can be found from the remainder portion of such portions, or by KNI % 128 or KNI mod 128; this value is the offset of the particular location of such title key entry from the top entry in such title key file where such title key entry is to be found.

In one example illustrated in FIG. 3B, it is assumed that one wishes to find the particular title key file and the location within such a file for the title key entry i (TKE i) so that the key navigation index (KNI) is i. Thus the title key entry that indicates the status of such title key entry is KFS[i] in the key navigation file 104. In the particular example illustrated in FIG. 3B, such status bit is found in the key file status field 001: KFS001. The particular title key file where such title key entry can be found is given by i % 128 or i mod 128. In the example illustrated if FIG. 3B, i has a value between 129 and 255, so that the integer portion of i divided by 128 is 1, so that it is readily determined that the title key file key_file.001 contains the corresponding title key entry i. One then determines the remainder portion of the division by performing the operation i mod128, which provides the offset of the title key entry TKEi from the top entry in title key file key_file.001. Thus by two very simple operations as illustrated above, the particular title key file and the location within such file that contains the title key entry corresponds to a particular location in the key navigation file can be found.

In the above embodiment, each of the title key files contains 128 entries of 16 bytes each. Obviously, the title key files may contain a number of entries different from 128 where each entry may have a number of bytes different from 16. Thus where each title key file has m entries, m being any positive integer, then the above operation would need to be modified so that the KNI or key navigation index is divided by m instead of 128. The offset is found by i mod m instead to find the offset of the title key entry TKEi from the top entry in such title key file. All such variations are within the scope of the invention.

Instead of using a unique number KNI and the operations i/m and i mod m as described above to locate the key in a title key file or to locate a status bit in the key navigation file, the one-to-one correspondence relationship between an entry in the key navigation file and a TKE in each of the title key files can be established by means of a look up table. The CPU 12 will then need to check the look up table to find the location of a corresponding key given a location of a status bit in the key navigation file, and vice versa (i.e. to find the status bit in the key navigation file that reveals the key status given the location of a key in a particular title key file). Such and other variations are within the scope of the invention.

In one embodiment, only 7 bytes of the 16 bytes are used in each title key entry for the value of a key for encryption/decryption. Preferably, the key value is ciphered or encrypted using another key. In the embodiment of FIG. 3B, when the title key status bit is of value 0, this indicates that the title key entry is busy, meaning either that the bit has been reserved such as in the case of the header of each title key file, or that the corresponding title key entry contains a valid key, and therefore not available for storing a new key. Where the title key status bit is of value 1, this indicates that the corresponding title key entry is empty, or that it does not contain a valid key, so that the corresponding slot or location in the title key file is available for storing an encryption/decryption key by over writing the title key entry in such slot or location.

The length of the key navigation file is not defined but is determined by the number of title key files. In the embodiment illustrated in FIGS. 3A and 3B, the key navigation file comprises 512-byte records. Therefore, even though the length of the file is not defined, it is in multiples of 512 bytes in the embodiment of FIGS. 3A and 3B. New records may be added to the file as necessary. The title key status bit value is a Boolean number, while the serial number of the title key files, the key navigation index are decimal numbers in the embodiment of FIGS. 3A an 3B.

Figure 4:
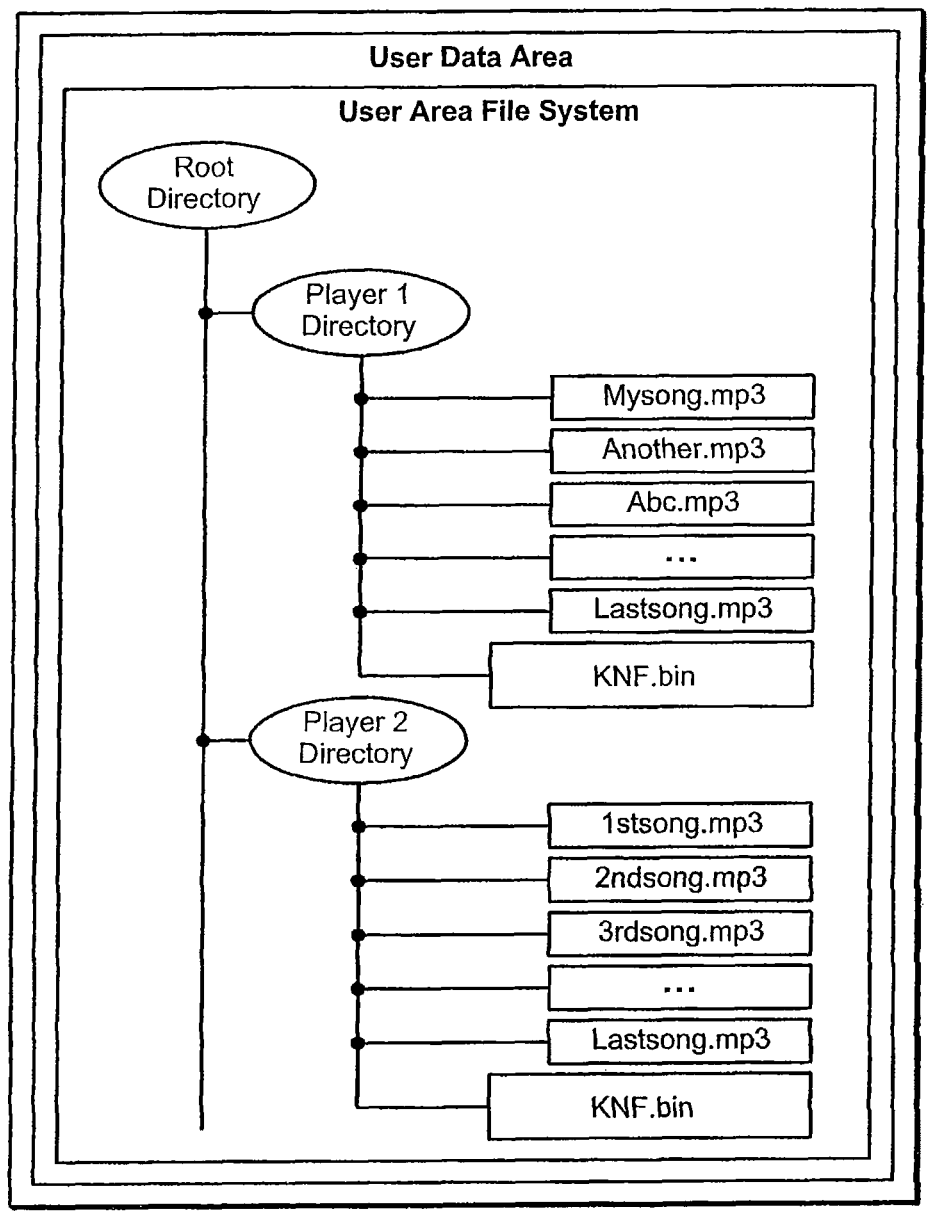
FIG. 4 is a diagram illustrating a directory tree in an unprotected user data area useful for key navigation and key management.

FIG. 4 is a schematic view of directory tree structure 130 in an unprotected user data area used for illustrating one embodiment of the invention. The directory tree structure 130 in FIG. 4 is a file stored in flash memory 20 where the directory structure may be accessed by any user, device or application without authentication, since it is stored in an unprotected user data area. As shown in FIG. 4, the directory tree structure has a root directory and two side branches: A player 1 directory and a player 2 directory. Player 1 or 2 can be any user, device or application. The two branches allow easy access by two different players. The player 1 directory lists a number of different content files, such as "Mysong.MP3," "Another.MP3" . . . and a key navigation file, "KNF.bin." The player 2 directory contains a similar list of content files and another key navigation file, "KNF.bin." Thus when player 1 accesses the user data area, player 1 is directed towards the player 1 directory and the content files and the key navigation file under such directory. The same is true for access by player 2, which is directed towards the content files within the player 2 directory as well as the key navigation file in such directory. Thus, when player 1 creates a content file, this file is created and added to the list under the player 1 directory. When the content file is created for player 2, this new content file is also listed in the player 2 directory.

Figure 5:
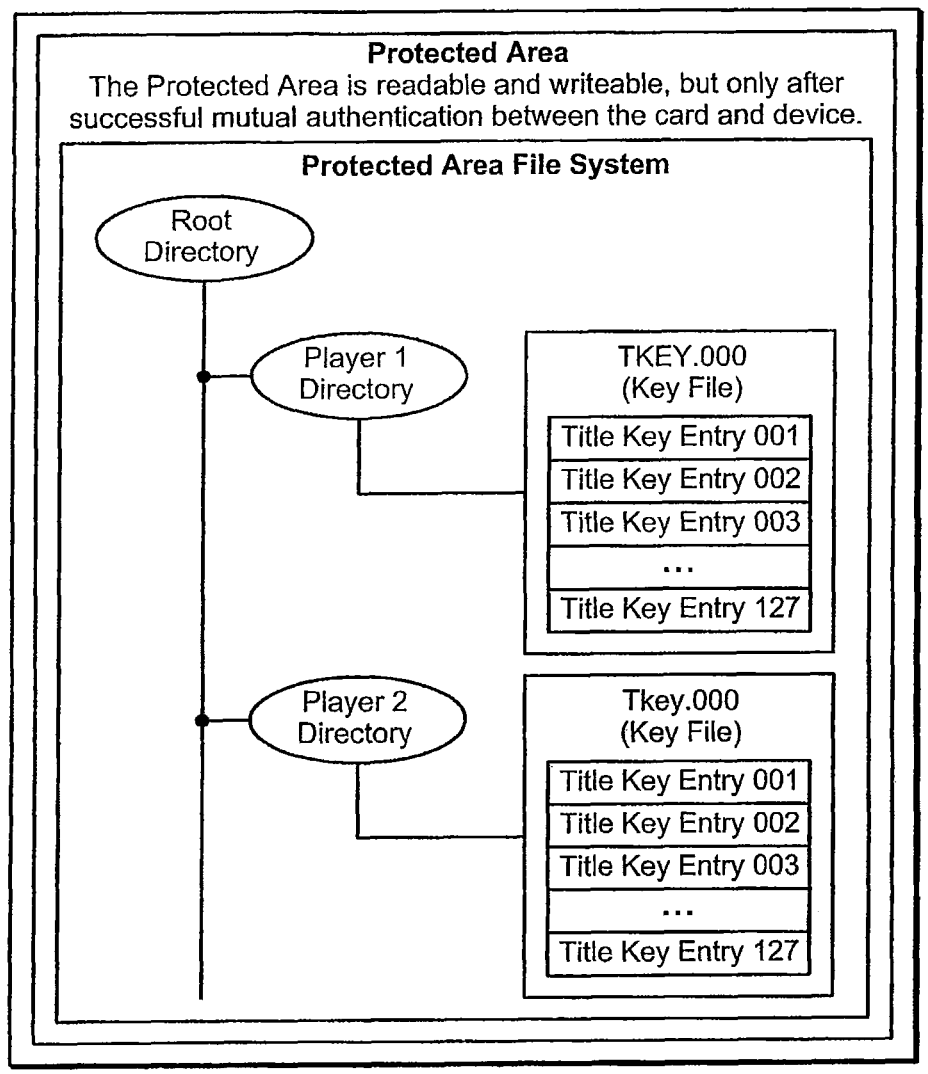
FIG. 5 is a diagram of a directory tree in the protected area useful for key navigation and key management.

The content files in tree 130 (e.g. "Mysong.MP3," "Another.MP3" . . . ) are encrypted using keys stored in directories in tree 150 in FIG. 5. In some applications, both encrypted and non-encrypted content files (not shown in FIG. 4) may also be stored in the same unprotected user data area which can be accessed without authentication.

FIG. 5 is a schematic view of a directory tree 150 in a protected area in memory device 20 where the directory trees 130 and 150 of FIGS. 4 and 5 mirror each other. Thus in FIG. 5, the directory tree has a root directory as well as a player 1 directory and player 2 directory. The player 1 directory lists the title key file key_file.000 which contains a number of different title key entries for encrypting and/or decrypting the content files in player 1 directory in tree 130. The player 2 directory also contains a title key file key_file.000 containing a number of title key entries. It will be noted that even though the two title key files under the two directors have the same name (i.e. key_file.000), they will not be confused since they are in different directories. The same is true for the key navigation files in the two directories in tree 130 in FIG. 4.

The two directory trees 130 and 150 mirror each other since they have the same branches: player 1 directory and player 2 directory, even though the contents of the directories player 1 and player 2 differ between the two trees 130 and 150. It is possible for the two directories between each of the trees 130 and 150 to have more branches at the same level as player 1 and player 2, such as player 3 (not shown in FIGS. 4 and 5) and so on. It is also possible for the two directories player 1 and player 2 to have subdirectories. For example, the player 1 directory in tree 130 may have two subdirectories: one for video files and one for audio files (not shown in FIG. 4). The audio file subdirectory will contain a list of audio files such as songs and a key navigation file for navigation among such audio files. The video subdirectory may contain video files and a key navigation file for navigation among such audio files. In such event, directory tree 150 in FIG. 5 will also have a similar tree structure. Thus the player 1 directory in tree 150 may have two different subdirectories: an audio and a video subdirectory (not shown in FIG. 5). The video subdirectory contains a list of title key file or files each containing the title key entries used for encrypting/decrypting the video files in the video subdirectory of directory tree 130. Directory tree 150 will also have an audio subdirectory under the player 1 directory where the audio subdirectory will contain one or more title key files each containing title key entries used for encrypting/decrypting the corresponding audio files listed in the audio subdirectory of directory tree 130. As will be explained below, having directory trees 130 and 150 that are mirrors of each other in the unprotected and protected areas greatly facilitates the operation of the key navigation mechanism.

Before any protected content file has been created in memory device 20, typically, there is no key navigation file or key storage file in memory device 20. In such event, when the first content file to be protected is created, a key manager referred to herein as a key navigation mechanism also creates the key navigation file in the unprotected user area and a first title key storage file in the protected area.

Figure 6:
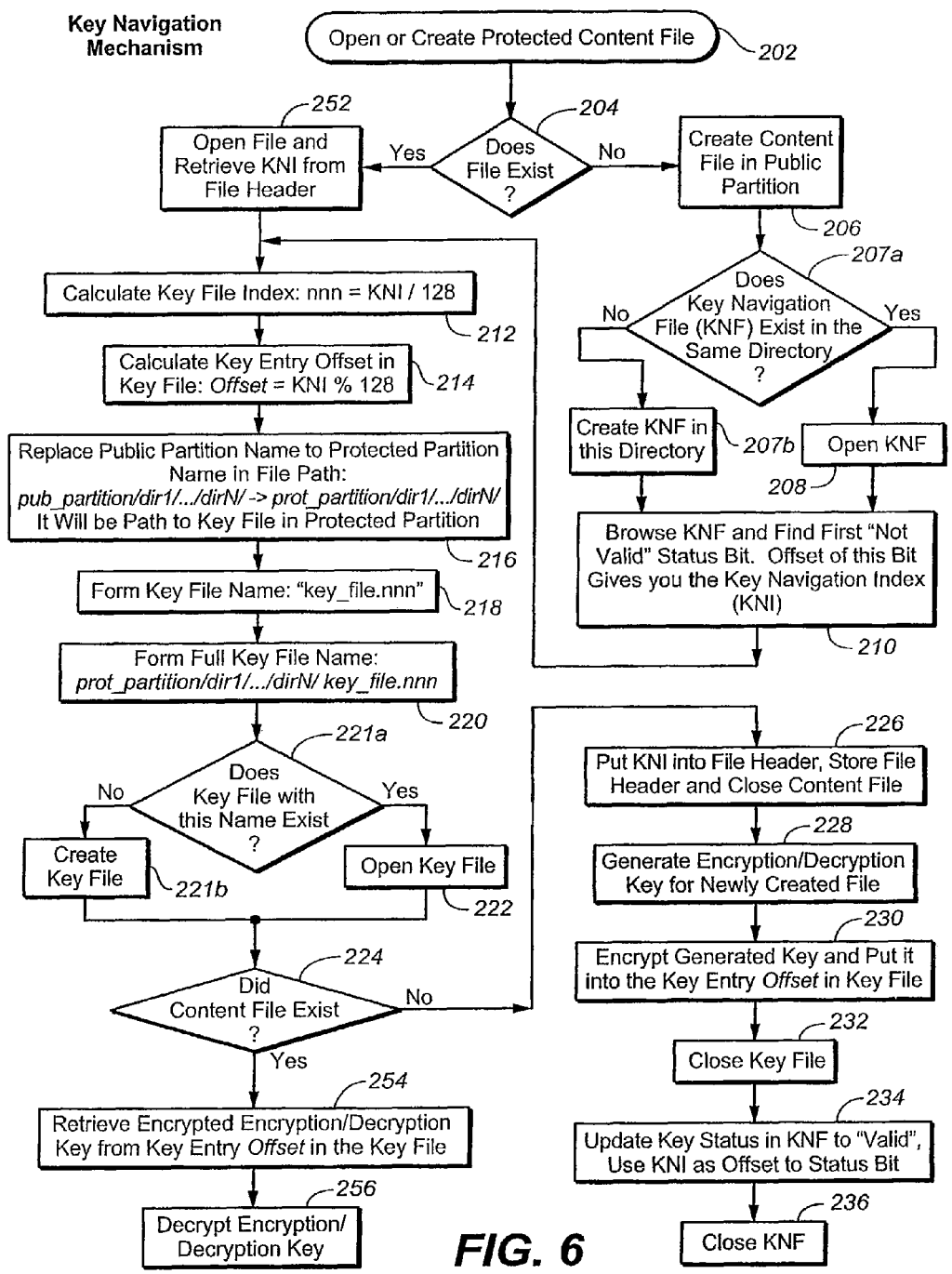
FIG. 6 is a flow chart illustrating a key navigation mechanism for key management.
Figure 7:
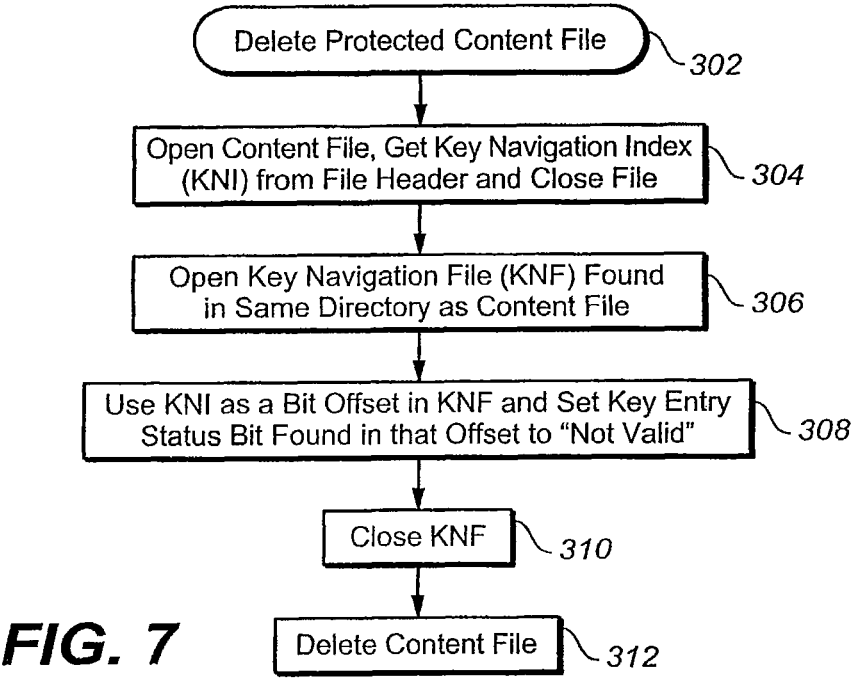
FIG. 7 is a flow chart illustrating a key navigation mechanism for deleting a file to illustrate a further feature of a key management system.

FIG. 6 is a flow chart illustrating the process or method carried out by a key navigation mechanism. The mechanism performing the process of FIG. 6 may comprise computer program code stored in and executed by the host device 24 which sends commands to the memory system where the content files, title key files and the key navigation files are stored. Alternatively, the mechanism may comprise computer program code stored in flash memory 20 that is loaded to and executed by CPU 12. Thus the computer program for the key navigation mechanism of FIGS. 6 and 7 may be stored in a computer readable medium which is a part of or connected to host device 24; alternatively, such computer program may be stored in flash memory 20 where the title key files, the key navigation file and content files are stored. All such variations are within the scope of the invention.

In reference to FIG. 6, the process of the mechanism of FIG. 6 starts if it is desired to either open a protected content file, or when a protected content file is to be created (Block 202). The key navigation mechanism determines whether a content file exists or not (diamond 204). If the content file does not exist, this means one needs to be created and host device 24 or CPU 12 proceeds to create the file (block 206), such as for player 1 in directory tree 130. After the content file has been created, the key navigation mechanism checks on whether a key navigation file already exists or has already been created (diamond 207a). If it has not been, then the mechanism creates a key navigation file (block 207b). If it has been, then the mechanism opens the key navigation file found in the same directory as the newly created content file, in a directory such as directory 130 illustrated in FIG. 4 (Block 208). In either case, the mechanism then checks the key navigation file in the player 1 directory in tree 130 and finds the first key entry with "empty" status. The offset of "empty" status in the key navigation file gives the key navigation index (KNI) (blocks 208 and 210), employing the embodiment above that uses KNI.

When the title key files and the key navigation files are used in the above implementation, the locations or title key entries in the title key files are used sequentially. This means that when one encryption/decryption key is created and needs to be stored in the title key files, the slots or locations in the title key files are used for storing keys sequentially, starting with the title key entry 1 in the title key file key_file.000. After such key is stored and forms the key entry, TKE1, or a part of it, its corresponding key file status bit KFS[1] value is changed from 1 to 0, indicating that it is not empty and now is busy, meaning that it now contains a valid key, since this location is not one reserved for a header. Initially, all of the key file status bits have the value 1, except for the key file status bits for 0, 128, 256 . . . , which have the value 0.

After the KNI has been obtained, the key navigation mechanism then calculates the key file index or mm which is equal to integer portion of KNI/128 (block 212), where each of the title key files has 128 slots or locations. nnn or the key file index is the integer portion of the number KNI/128. This nnn or the key file index value is the serial number of the title key file. Then the offset within such title key file is obtained by computing the quantity KNI %128 or KNI mod 128 (block 214).

As noted above, the content file is created within a directory, such as the player 1 directory in directory tree 130 in FIG. 4. In order to obtain the location in the title key file in the protected area for storing the encryption/decryption key for encrypting and/or decrypting the content file that has just been created, the key navigation mechanism then converts an access path constructed in accordance with the directory tree 130 in the unprotected user data area to one that is constructed in accordance with the directory tree 150 in the protected area or partition, by replacing the public partition name for the non-protected user data area with the protected partition name for the protected area (block 216). The key navigation mechanism then forms the key file name: "key_file.nnn." (Block 218) The key navigation mechanism then forms the full key file name (Block 220). As one example, assuming that player 1 is creating a new song file that is to be encrypted in accordance with blocks 208, 210, 212, 214, 216, 218 and 220. In such event, the full key file name created will be "prot_partition/layer1directory/key_file.nnn."

The key navigation mechanism then checks to see if a title key file exists with this key file name (diamond 221a). If this title key file does not exist, the mechanism creates one and adds it to the appropriate directory (e.g. player 1) in directory tree 150 (block 221b). If this title key file exists, the mechanism opens the title key file using the access path in accordance to the full key file name. (Block 222) The key navigation mechanism then checks whether the content file has existed originally before block 206 (diamond 224). In the example above, such content file did not exist prior to its creation in block 206, so that the key navigation mechanism proceeds to block 226 to put the KNI into the file header of the file created. The content encryption key (CEK) is created by crypto engine 40 and used to encrypt the file created (228). The encrypted newly created file is added to the directory player 1 in tree 130 in memory device 20. This created key is encrypted and put into the title key file identified in block 212 and at the location indicated by the offset obtained in block 214 (block 230), and added as a new title key entry to the title key file in directory player 1 in tree 150. The key navigation mechanism then closes the title key file (block 232), and changes the value of its corresponding status bit in the key navigation file in the player 1 directory in tree 130 from 1 to 0 where the key file status bit is located by using the value of KNI as an offset in the key navigation file in the player 1 directory in tree 130. The key navigation file is then closed (blocks 234 and 236).

The above is the process of the key navigation mechanism using the two directory trees 130 and 150 when a content file to be encrypted (and/or decrypted) is first created. When it is desired to decrypt a content file so that the key navigation mechanism is requested to find the decryption key needed for decrypting the content file, the key navigation mechanism of FIG. 6 operates as follows. The key navigation mechanism would open the protected content file in a particular directory, such as player 1 directory in tree 130, and proceed to block 252, since the content file already exists. The key navigation mechanism then retrieves the value KNI from the file header of the content file (block 252). When the key navigation mechanism opens the protected content file, it is operating within the directory tree 130 in the unprotected user data area. For example, if the protected content file is one of the song files in the player 1 directory, such as the song "Mysong.MP3," the access path to such content file is constructed in accordance with the directory tree 130. The key navigation mechanism then performs the operations in blocks 212-222 in the manner described above to find the key file index or nnn of a certain title key file in which the decryption key for the decrypting (and/or encrypting) the content file is stored, and the offset indicating the location of the key in such title key file. The key navigation mechanism also converts an access path to the public or unprotected user data area in accordance with directory tree 130 to an access path constructed in accordance with directory tree 150 in the protected area and builds a full key file name for the decryption key in the protected area in accordance with blocks 216, 218 and 220. After an authentication process, the key navigation mechanism then opens the title key file in the protected area in accordance with the full key file name constructed (block 222) so that the content decryption key is now readily available to be retrieved. The key navigation mechanism then checks whether the content file exists prior to the above-described operation. In this example, it does exist so that the mechanism proceeds to block 254 to retrieve the encrypted content encryption key from the key entry offset in the proper title key file (block 254). The content encryption key is then decrypted and used for decrypting/encrypting the content file that has been or will be protected by encryption. (block 256).

Using the above-described key navigation file, title key file structure, it is particularly simple when a content file is to be deleted. This is illustrated in the flow chart of FIG. 7. Thus the key navigation mechanism for this purpose, which may be a computer program stored in and executed by either the host device 24 or memory system 10, first identifies in a directory the protected content file that is to be deleted (block 302). The content file may be in an unprotected public area of the memory 20. The key navigation mechanism then opens the content file and obtains KNI from the file header and closes the file (block 304). The mechanism then opens the key navigation file in the same directory as the content file. (block 306). For example, if the content file to be deleted is in the player 1 directory in the directory tree 130, for example, the bit offset is found in the key navigation file within the same directory as the content file (player 1 directory in this instance). The key navigation mechanism then uses the KNI as the offset from the first entry in the key navigation file to find the position of the key file status bit that indicates the status of the title key entry in the title key file that is used to encrypt/decrypt the content file to be deleted. It then resets the key file status bit found at the offset location from 0 to a 1, thereby indicating that the corresponding title key entry (TKE) in the title key file of that file status bit does not contain a valid key. (block 308). This therefore indicates that the location of such corresponding TKE in the title key file may be now used for storing a new key and is essentially "empty." There is no need to actually go into the protected area (which typically requires authentication) and delete the key at such location in the title key file. The key navigation mechanism then closes the key navigation file and proceeds to delete the content file (blocks 310 and 312).

Rights Object Management

The above described system for managing keys can also be used for managing other types of content protection information, such as rules specifying that the content file may only be accessed for a limited number of times, before certain expiration dates or only for certain time durations. In DRM, such rules are handled together with the content encryption/decryption keys that are used for protecting content in objects known as rights objects. In order to find out how an encrypted content file may be used and/or accessed, one would first locate its rights object, extract the encryption/decryption key from it, and the rules governing its use. Then the content file is decrypted/encrypted using the key, and the content may be accessed. Sometimes a content file may be downloaded or otherwise received, and its rights object will need to be found. If the file is encrypted when downloaded, it may be necessary to purchase the rights for access; in such event, the rights object will be supplied and can be downloaded after purchase. If the downloaded file is not encrypted, then a rights object can be created to protect the content file. Once the rights object is obtained, the key in the rights object is then extracted from the rights object, and the content file encrypted or decrypted using the key. The file may then be further handled as appropriate. Conversely, after a file has been created, a rights object may be created for it, where the object includes a key used for its encryption/decryption.

Where additional security is desired, the decrypted content file may be re-encrypted using a key that is different from the one in the rights object. In this manner, an unauthorized user who also has access to the rights object for the content file will not be able to access such re-encrypted content file. Thus, the user who downloaded the content file may generate a key that is different from the one in the rights object obtained from the rights issuer and re-encrypts the content file after it has been decrypted using the key in the rights object obtained from the rights issuer. The key in the rights object is then replaced by the key generated by the user. Alternatively, the user may simply encrypt the content file using a key he/she generated without first decrypting it, so that the content file is encrypted by two different keys: a key from the rights issuer (which means the content file can be decrypted by means of a first key in the rights object), and a second key generated by the user which second key is available only to the user who generated it. The user then stores the additional second key also in the rights object.

Figure 9:
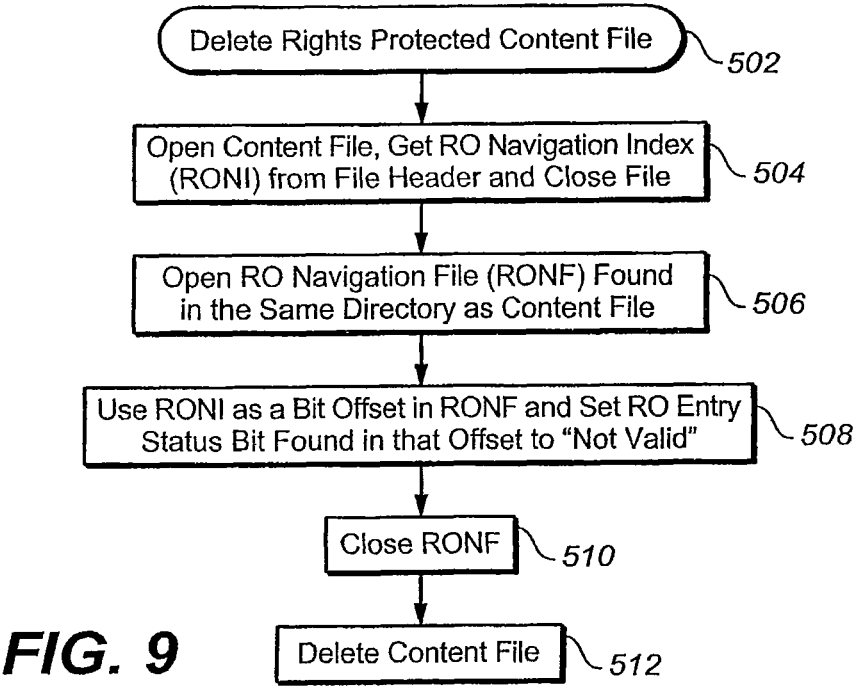
FIG. 9 is a flow chart illustrating a rights object navigation mechanism for deleting a file to illustrate a further feature of a rights object management system.
Figure 8:
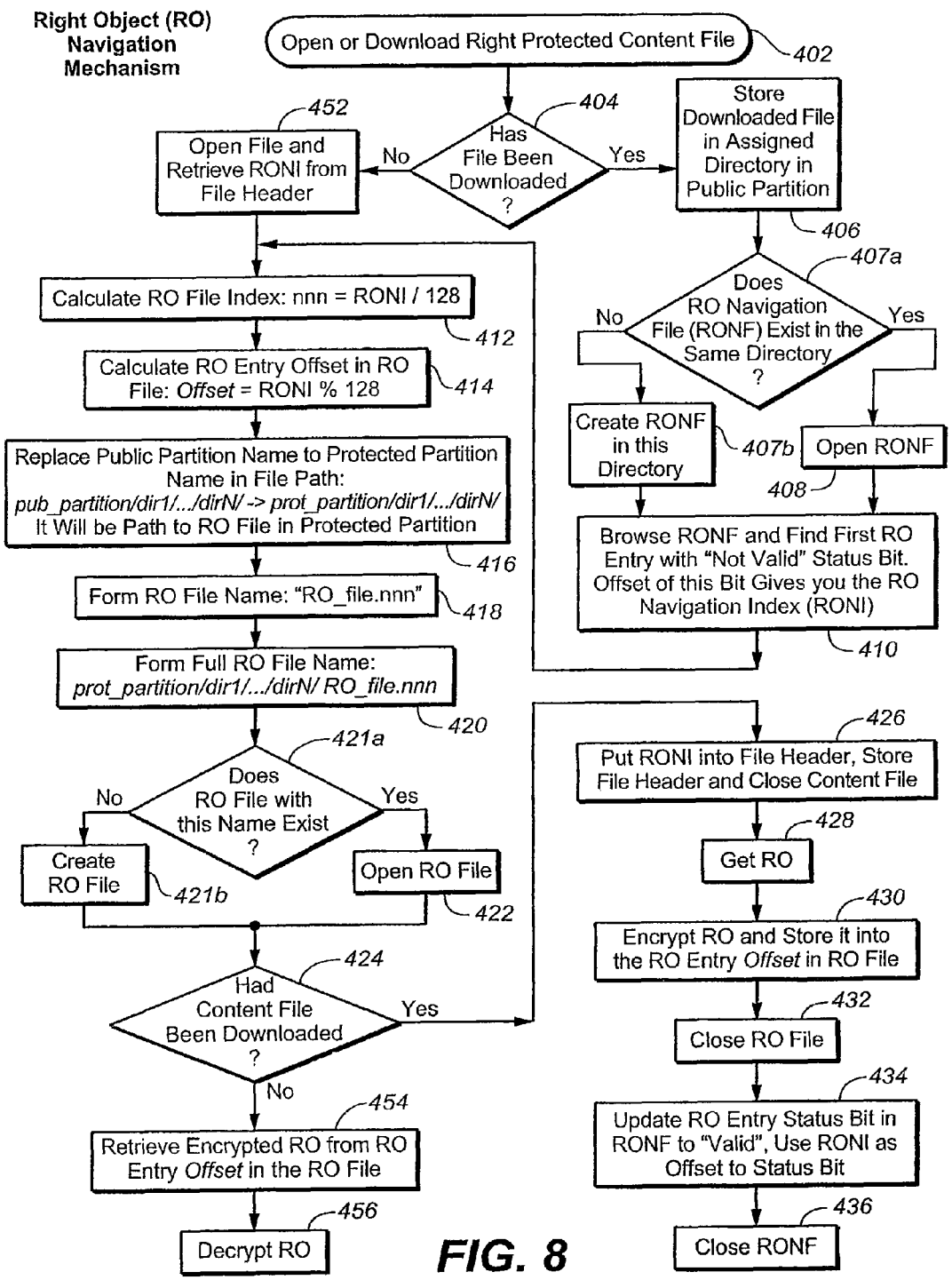
FIG. 8 is a flow chart illustrating a rights object navigation mechanism for rights object management.

FIG. 8 is a flow chart illustrating a rights object (RO) navigation mechanism for rights object management. The RO navigation mechanism performing the process of FIG. 8 may comprise computer program code stored in and executed by the host device 24 which sends commands to the memory system where the content files, RO files and the key navigation files are stored. Alternatively, the mechanism may comprise computer program code stored in flash memory 20 that is loaded to and executed by CPU 12. Thus the computer program for the RO navigation mechanism of FIGS. 8 and 9 may be stored in a computer readable medium which is a part of or connected to host device 24; alternatively, such computer program may be stored in flash memory 20 where the RO files, the rights object navigation file and content files are stored. All such variations are within the scope of the invention. A comparison of FIGS. 6, 7 on one hand and FIGS. 8 and 9 on the other will reveal that they are quite similar, so that the RO management process of FIGS. 8 and 9 is quite similar to the key management process of FIGS. 6 and 7 respectively.

In such event, an architecture and concept for RO management similar to key management described above may be used, such as RONI used for labeling RO entries (ROE) across RO files (similar in concept to KNI), in a manner similar to that illustrated in FIG. 3B. Status bits ROS[i] in a RO navigation file are used for indicating whether the corresponding ith RO is valid or not in one of the RO files. The RO navigation file may be stored in a public partition or area along with the content files in directories in directory trees in the same manner as that shown in FIG. 4 involving key management. The RO files are stored in a protected partition or area in directories in directory trees in the same manner as that shown in FIG. 5 for key management, where the trees in the two areas are mirrors of each other (not shown).

In reference to FIG. 8, the process of the mechanism of FIG. 8 starts if it is desired to either open or download a protected content file (Block 402). The RO navigation mechanism determines whether a content file has been downloaded or not (diamond 404). If the content file has not been downloaded, this means that the content file exists already so that there is no need to download. Assuming that the content file has been downloaded and needs to be protected, the mechanism proceeds to block 406 and stores the file in the assigned directory in the public domain (similar to the public area in FIG. 4). The RO navigation mechanism checks on whether a RO navigation file exists in the same directory (diamond 407a). If it does not, then the mechanism creates a RO navigation file (block 407b). If it exists, then the mechanism opens the RO navigation file found in the same directory as the downloaded content file, similar to that found in FIG. 4 (Block 408). In either case, the mechanism then checks the RO navigation file in the appropriate directory in a directory tree and finds the first RO entry with "empty" or "not valid" status. The offset of "empty" or "not valid" status in the RO navigation file gives the RO navigation index (RONI) (blocks 408 and 410), employing the embodiment above that uses RONI.

When the RO files and the RO navigation files are used in the above implementation, the locations or RO entries in the RO files are used sequentially. This means that when one RO is created and needs to be stored in the RO files, the slots or locations in the RO files are used for storing ROs sequentially, starting with the RO entry 1 in the RO file RO file.000. After such RO is stored and forms the first RO entry, or a part of it, its corresponding RO file status bit ROS[1] value is changed from 1 to 0, indicating that it is not empty and now is busy, meaning that it now contains a valid RO, since this location is not one reserved for a header. Initially, all of the RO file status bits have the value 1, except for the RO file status bits for 0, 128, 256 . . . , which have the value 0. It will be understood, however, that instead of this embodiment, a lookup table may be used instead as in the case of the key navigation mechanism; all such variations are within the scope of the invention.

After the RONI has been obtained, the RO navigation mechanism then calculates the RO file index or nnn which is equal to integer portion of RONI/128 (block 412), where each of the RO files has 128 slots or locations. nnn or the RO file index is the integer portion of the number RONI/128. This nnn or the RO file index value is the serial number of the RO file. Then the offset within such RO file is obtained by computing the quantity RONI %128 or RONI mod 128 (block 414).

As noted above, the downloaded content file is assigned to a directory, (such as a directory analogous to the player 1 directory in directory tree 130 in FIG. 4). In order to obtain the location in the RO file in the protected area for storing the RO for controlling use of and/or access to the content file that has just been downloaded, the RO navigation mechanism then converts an access path constructed in accordance with the directory tree in the unprotected user data area to one that is constructed in accordance with the directory tree in the protected area or partition, by replacing the public partition name for the non-protected user data area with the protected partition name for the protected area (block 416), again in a manner similar to that in FIG. 6. The RO navigation mechanism then forms the RO file name: "RO_file.nnn." (Block 418) The RO navigation mechanism then forms the full RO file name (Block 420). As one example, assuming that player x is creating a new content file that is to be controlled by an RO to be created or downloaded, the full RO file name in which this RO is to be stored is constructed in accordance with blocks 408, 410, 412, 414, 416, 418 and 420. In such event, the full RO file name created will be "prot_partition/playerxdirectory/RO_file.nnn."

The RO navigation mechanism then checks to see if a RO file exists with this RO file name (diamond 421a). If this RO file does not exists, the mechanism creates one and adds it to the appropriate directory (e.g. player x) in a directory tree (block 421b) in the protected area or partition. If this RO file exists, the mechanism opens the RO file using the access path in accordance to the full RO file name. (Block 422) The RO navigation mechanism then checks whether the content file has been downloaded or not originally at block 406 (diamond 424). In the example above, such content file was downloaded, so that the RO navigation mechanism proceeds to block 426 to put the RONI into the file header of the file downloaded. Thus the RONI also serves to associate each RO with the content file it is controlling, while also serving the above described functions for RO navigation and management.

The RO (including key) is created by crypto engine 40 or otherwise obtained (e.g. downloaded after purchase) and the key generated or so obtained is used to encrypt the file downloaded (428). The encrypted newly downloaded file is added to the directory player x in the tree in the public area or partition in memory device 20. This RO is encrypted and put into the RO file identified in block 412 and at the location indicated by the offset obtained in block 414 (block 430), and added as a new RO entry to the RO file in the directory player x in the tree in the protected partition or area. The RO navigation mechanism then closes the RO file (block 432), and changes the value of its corresponding status bit in the RO navigation file in the player x directory in tree in the public area from 1 to 0 where the RO file status bit is located by using the value of RUNT as an offset in the RO navigation file in the player x directory in the tree in the public area. The RO navigation file is then closed (blocks 434 and 436).

The above is the process of the RO navigation mechanism using the two directory trees when a content file to be associated with a RO is first downloaded and encrypted (and/or decrypted). When it is desired to access an existing content file (i.e. not one downloaded) so that the RO navigation mechanism is requested to find the RO needed for accessing the content file, the RO navigation mechanism of FIG. 8 operates as follows. The RO navigation mechanism would open the protected content file in a particular directory, such as player x directory in the public area, and proceed to block 452, since the content file already exists. The RO navigation mechanism then retrieves the value RONI from the file header of the content file (block 452). When the RO navigation mechanism opens the protected content file, it is operating within the directory tree in the unprotected user data area. For example, if the protected content file is one of the song files in the player x directory, the access path to such content file is constructed in accordance with such directory tree. The RO navigation mechanism then performs the operations in blocks 412-422 in the manner described above to find the RO file index or nnn of a certain RO file in which the RO associated with the content file is stored, and the offset indicating the location of the RO in such RO file. The RO navigation mechanism also converts an access path to the public or unprotected user data area in accordance with directory tree in the public area to an access path constructed in accordance with directory tree in the protected area and builds a full RO file name for the decryption RO in the protected area in accordance with blocks 416, 418 and 420. After an authentication process, the RO navigation mechanism then opens the RO file in the protected area in accordance with the full RO file name constructed (block 422) so that the RO is now readily available to be retrieved. The RO navigation mechanism then checks whether the content file exists prior to the above-described operation. In this example, it does exist so that the mechanism proceeds to block 454 to retrieve the encrypted RO from the RO entry at the offset in the proper RO file (block 254). The RO is then decrypted and the key therein used for decrypting/encrypting the content file according to the rules in RO (block 456).

FIG. 9 is a flow chart illustrating a rights object navigation mechanism for deleting a file to illustrate a further feature of a rights object management system. Using the above-described RO navigation file, RO file structure, it is particularly simple when a content file is to be deleted. This is illustrated in the flow chart of FIG. 9. Thus the RO navigation mechanism for this purpose, which may be a computer program stored in and executed by either the host device 24 or memory system 10, first identifies in a directory the protected content file that is to be deleted (block 502). The content file may be in an unprotected public area of the memory 20. The RO navigation mechanism then opens the content file and obtains RONI from the file header and closes the file (block 504). The mechanism then opens the RO navigation file in the same directory as the content file. (block 506). For example, if the content file to be deleted is in the player x directory in a directory tree in the public area or partition, for example, the bit offset is found in the RO navigation file within the same directory as the content file (player x directory in this instance). The RO navigation mechanism then uses the RONI as the offset from the first entry in the RO navigation file to find the position of the RO file status bit that indicates the status of the RO entry in the RO file that is associated with the content file to be deleted. It then resets the RO file status bit found at the offset location from 0 to a 1, thereby indicating that the corresponding RO entry (ROE) in the RO file of that file status bit does not contain a valid RO. (block 508). This therefore indicates that the location of such corresponding ROE in the RO file may be now used for storing a new RO and is essentially "empty" or "not valid." There is no need to actually go into the protected area (which typically requires authentication) and delete the RO at such location in the RO file. The RO navigation mechanism then closes the RO navigation file and proceeds to delete the content file (blocks 510 and 512).

While the invention has been described above by reference to various embodiments, it will be understood that changes and modifications may be made without departing from the scope of the invention, which is to be defined only by the appended claims and their equivalents. For example, processes similar to that of FIG. 6 can also be applied for finding location in one of the title key storage file(s) for storing key for decryption that has been created, and for finding an existing encryption key in one of the title key storage file(s) for encrypting an existing file. The keys or RO may be used for protection of any content, including media titles such as songs, movies, games as well as other types of content with or without titles. The navigation or location information may be stored in parts of the content file that are different from the header, such as in the file name. All references referred to herein are incorporated by reference.

What is claimed is:

1. A method for controlling use of and/or access to a content file using a rights object navigation file and one or more rights object storage files, wherein each of the entries in the rights object navigation file corresponds to a location for storing one of a plurality of rights objects in the one or more rights object storage files, comprising:
   obtaining the rights object navigation file from the content file after the content file has been opened;
   opening the rights object navigation file;
   finding in the rights object navigation file an entry other than one that corresponds to a location of a valid rights object in the one or more rights object storage files;
   obtaining a rights object;
   controlling use of and/or access to the content file in accordance with the rights object; and
   storing the rights object at the location in the one of the rights object storage file(s) corresponding to the entry;
   wherein the content file is encrypted, and wherein a key for decrypting the encrypted content file is identified by information in a header of the content file; and
   wherein the rights object navigation file is stored in a public memory area, wherein the key is stored in a private memory area, and wherein key management is performed by modifying the rights object navigation file in the public memory area which does not require access to the private memory area.

2. The method of claim 1, said method further comprising obtaining, from location of said entry in the rights object navigation file, rights object navigation information for the content file.

3. The method of claim 2, said method using a plurality of rights object storage files each having m entries, wherein the rights object navigation information comprises an index which has a different value for each entry in the rights object navigation file, said method further comprising finding the location in the one or more rights object storage files corresponding to the entry for storing the rights object, wherein said finding includes dividing the index by m to obtain a quotient, to obtain an integer equal to the integer portion of the quotient, and an offset equal to the remainder portion of the quotient.

4. The method of claim 3, wherein the integer indicates which one of the one or more rights object storage file(s) where the rights object is to be stored by the storing and the offset indicates the location in such rights object storage file where the rights object is to be stored by the storing.

5. The method of claim 3, further comprising inserting the index into a header of the content file.

6. The method of claim 1, further comprising altering the entry in the rights object navigation file so that it corresponds to a valid rights object in the at least one rights object storage file.

7. The method of claim 1, said rights object navigation file and said one or more rights object storage files being stored in a storage medium, said medium comprising at least one protected area and at least one unprotected area, wherein the at least one protected area is accessible only to authenticated users, said one or more rights object storage files being stored in the at least one protected area, so that the storing stores the rights object in the at least one protected area.

8. The method of claim 1, further comprising constructing an access path to the one rights object storage file containing the location corresponding to the entry for storing the rights object.

9. The method of claim 8, said constructing including forming a rights object file name from the rights object navigation information.

10. The method of claim 9, said rights object navigation file and said one or more rights object storage files being stored in a storage medium, said medium comprising at least one protected area and at least one unprotected area, wherein the protected area is accessible only to authenticated users, said one or more rights object storage files being stored in the at least one protected area, said constructing further including deriving from the file name an access path to the one rights object storage file in the at least one protected area.

11. The method of claim 8, said medium comprising at least one protected area and at least one unprotected area, wherein the constructing converts an access path to a location in the at least one unprotected area to an access path for accessing the at least one protected area.

12. The method of claim 11, said medium comprising:
a first directory tree in the at least one unprotected area of the medium, said first directory tree comprising a directory which comprises a list of the plurality of content files and the rights object navigation file; and
a second directory tree in the at least one protected area of the medium, said second directory tree comprising a directory which comprises said one or more rights object storage files, wherein said two directory trees mirror each other,
wherein said converting converts an access path for accessing a location in the unprotected area to an access path for accessing the location in the one rights object storage file in the protected area using the two directory trees.

13. The method of claim 1, wherein said obtaining comprises generating the rights object.

14. The method of claim 1, wherein said obtaining comprises downloading the rights object.

15. The method of claim 14, further comprising generating a key and encrypting the content file using the key generated.

16. The method of claim 15, further comprising decrypting the content file using a key from the rights object, wherein the encrypting occurs after the decrypting.

17. The method of claim 15, further comprising replacing the key in the rights object by the key generated.

18. The method of claim 15, wherein the encrypting encrypts the content file where the content file is already encrypted by means of a key in the rights object.

19. The method of claim 18, further comprising storing the key generated in the rights object.

20. A method for controlling use of and/or access to a content file using a rights object in a rights object storage file in a protected area of a storage medium, wherein the content file contains rights object navigation information that indicates location of the rights object in the rights object storage file for controlling use of and/or access to the content file, comprising:
retrieving the rights object navigation information from a header of the content file after the content file has been opened;
deriving from the rights object navigation information the location in the rights object storage file in the protected area of the storage device at which the rights object is stored;
obtaining the rights object from the rights object storage file in the protected area of the storage medium using the derived location; and
controlling use of and/or access to the content file in accordance with the rights object;
wherein the content file is encrypted, and wherein a key for decrypting the encrypted content file is identified by information in a header of the content file; and
wherein the rights object navigation file is stored in a public memory area, wherein the key is stored in a private memory area, and wherein key management is performed by modifying the rights object navigation file in the public memory area, which does not require access to the private memory area.

21. The method of claim 20, said method using a plurality of rights object storage files each having m locations for storing rights objects, wherein the rights object navigation information comprises an index, said method further comprising finding which one of the plurality of rights object storage files stores the rights object, and the location in such rights object storage file at which the rights object is stored, by dividing the index by m to obtain a quotient, to obtain an integer equal to the integer portion of the quotient, and to obtain an offset equal to the remainder portion of the quotient.

22. The method of claim 21, wherein the integer indicates which one of the one or more rights object storage file(s) stores the rights object and the offset indicates the location in such rights object storage file where the rights object is stored.

23. The method of claim 20, said medium comprising an unprotected area, wherein the deriving also converts an access path to a location in the unprotected area to an access path for accessing the protected area.

24. The method of claim 23, said medium comprising:
a first directory tree in the unprotected area of the medium, said first directory tree comprising a directory which comprises a list of the plurality of content files and a rights object navigation file; and
a second directory tree in the at least one protected area of the medium, said second directory tree comprising a directory which comprises one or more rights object storage files, said two directory trees having structures that mirror each other,
wherein said converting converts an access path for accessing a location in the unprotected area to an the access path for accessing the location in the rights object storage file where the rights object is stored using the two directory trees.

25. A method for controlling use of and/or access to a content file comprising:
creating a rights object navigation file when such a file does not exist;
creating at least one rights object storage file when such a file does not exist, wherein each of the entries in the rights object navigation file corresponds to a location for storing one of a plurality of rights objects in the at least one rights object storage file;

finding in the rights object navigation file an entry other than one that corresponds to a valid rights object in the at least one rights object storage file;

obtaining from location of said entry in the rights object navigation file rights object navigation information for the content file, obtaining wherein the rights object navigation file is obtained from the content file after the content file has been opened;

generating a rights object;

controlling use of and/or access to the content file in accordance with the rights object;

storing the rights object at a location in the at least one rights object storage file corresponding to the entry;

wherein the content file is encrypted, and wherein a key for decrypting the encrypted content file is identified by information in a header of the content file; and wherein the rights object navigation file is stored in a public memory area, wherein the key is stored in a private memory area, and wherein key management is performed by modifying the rights object navigation file in the public memory area, which does not require access to the private memory area.

26. The method of claim 1, wherein the method is performed in a memory device configured to communicate with a host device.

27. The method of claim 1, wherein the method is performed in a host device.

28. The method of claim 27, wherein the host device has a memory embedded therein.

29. The method of claim 20, wherein the method is performed in a memory device configured to communicate with a host device.

30. The method of claim 20, wherein the method is performed in a host device.

31. The method of claim 30, wherein the host device has a memory embedded therein.

32. The method of claim 25, wherein the method is performed in a memory device configured to communicate with a host device.

33. The method of claim 25, wherein the method is performed in a host device.

34. The method of claim 33, wherein the host device has a memory embedded therein.

* * * * *